(12) United States Patent
Ogoro

(10) Patent No.: US 6,891,525 B2
(45) Date of Patent: May 10, 2005

(54) ELECTRONIC APPARATUS WITH BACKLIGHTING DEVICE

(75) Inventor: Kazuo Ogoro, Tokyo (JP)

(73) Assignee: NEC Corporation, Tokyo (JP)

( * ) Notice: Subject to any disclaimer, the term of this patent is extended or adjusted under 35 U.S.C. 154(b) by 377 days.

(21) Appl. No.: 09/773,596

(22) Filed: Feb. 2, 2001

(65) Prior Publication Data

US 2001/0013854 A1 Aug. 16, 2001

(30) Foreign Application Priority Data

Feb. 3, 2000 (JP) ........................................ 2000-026350

(51) Int. Cl.⁷ ................................................ G09G 3/36
(52) U.S. Cl. ........................ 345/102; 345/690; 455/574; 713/320
(58) Field of Search ................................. 345/102, 589, 345/690, 204, 211; 455/566, 574; 713/300, 320, 321, 323, 324

(56) References Cited

U.S. PATENT DOCUMENTS

| | | | | |
|---|---|---|---|---|
| 5,696,952 A | * | 12/1997 | Pontarelli | 713/600 |
| 6,021,502 A | * | 2/2000 | Ando | 713/340 |
| 6,076,171 A | * | 6/2000 | Kawata | 713/501 |
| 6,141,568 A | * | 10/2000 | Sakaguchi | 455/566 |
| 6,369,867 B1 | * | 4/2002 | Ge | 349/73 |

FOREIGN PATENT DOCUMENTS

| | | |
|---|---|---|
| GB | 2 354 406 | 3/2001 |
| JP | 64-61791 | 3/1989 |
| JP | 5-127626 | 5/1993 |
| JP | 6-160805 | 6/1994 |
| JP | 7-168541 | 7/1995 |
| JP | 9-26837 | 1/1997 |
| JP | 9-252342 | 9/1997 |
| JP | 10-197939 | 7/1998 |
| JP | 11-126118 | 5/1999 |
| JP | 11-154900 | 6/1999 |
| JP | 11-205863 | 7/1999 |
| JP | 11-341316 | 12/1999 |
| JP | 2001-53839 | 2/2001 |

* cited by examiner

Primary Examiner—Kent Chang
(74) Attorney, Agent, or Firm—Foley & Lardner LLP

(57) ABSTRACT

An electronic apparatus with backlit display and input device allowing reduced power consumption while maintaining necessary brightness is disclosed. A mode detecting section detects a currently set operation mode when performing a function. The brightness of the backlighting is controlled depending on the currently set operation mode. In the case of a data input mode, the brightness of the backlighting is reduced.

14 Claims, 6 Drawing Sheets

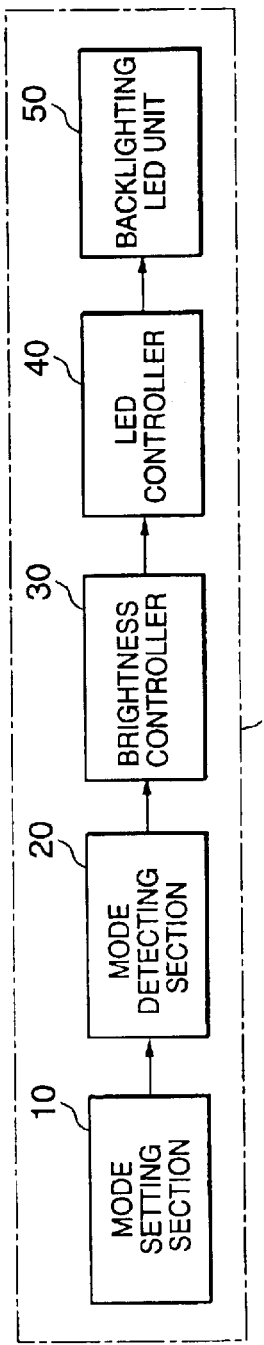
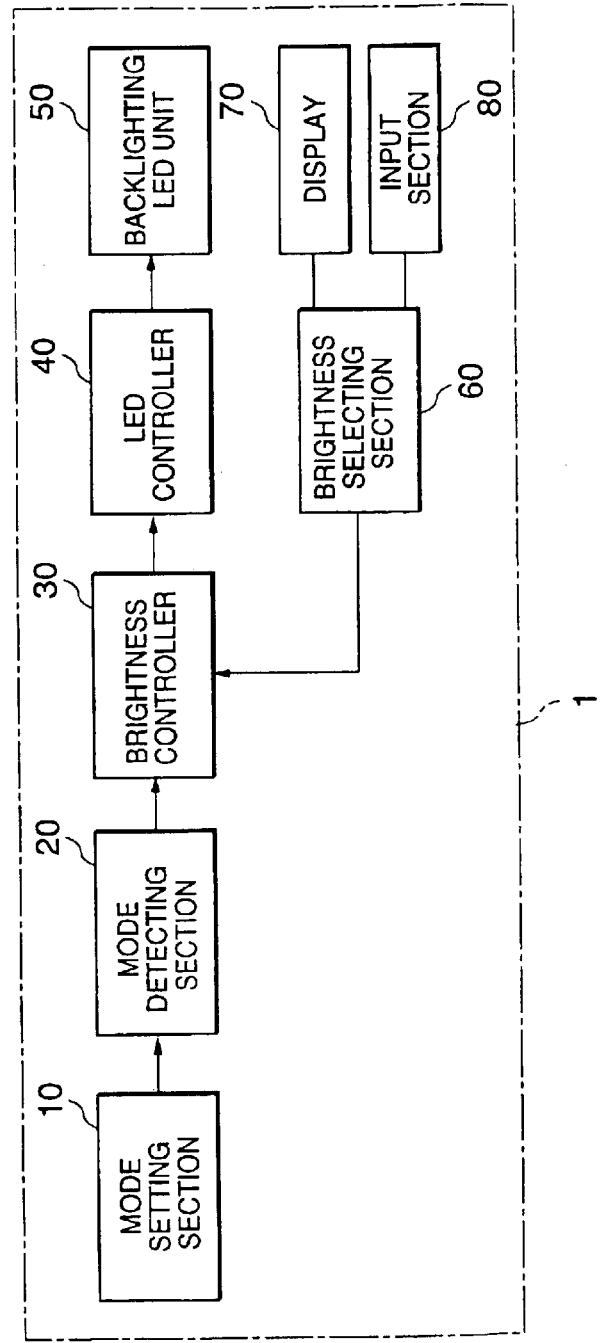

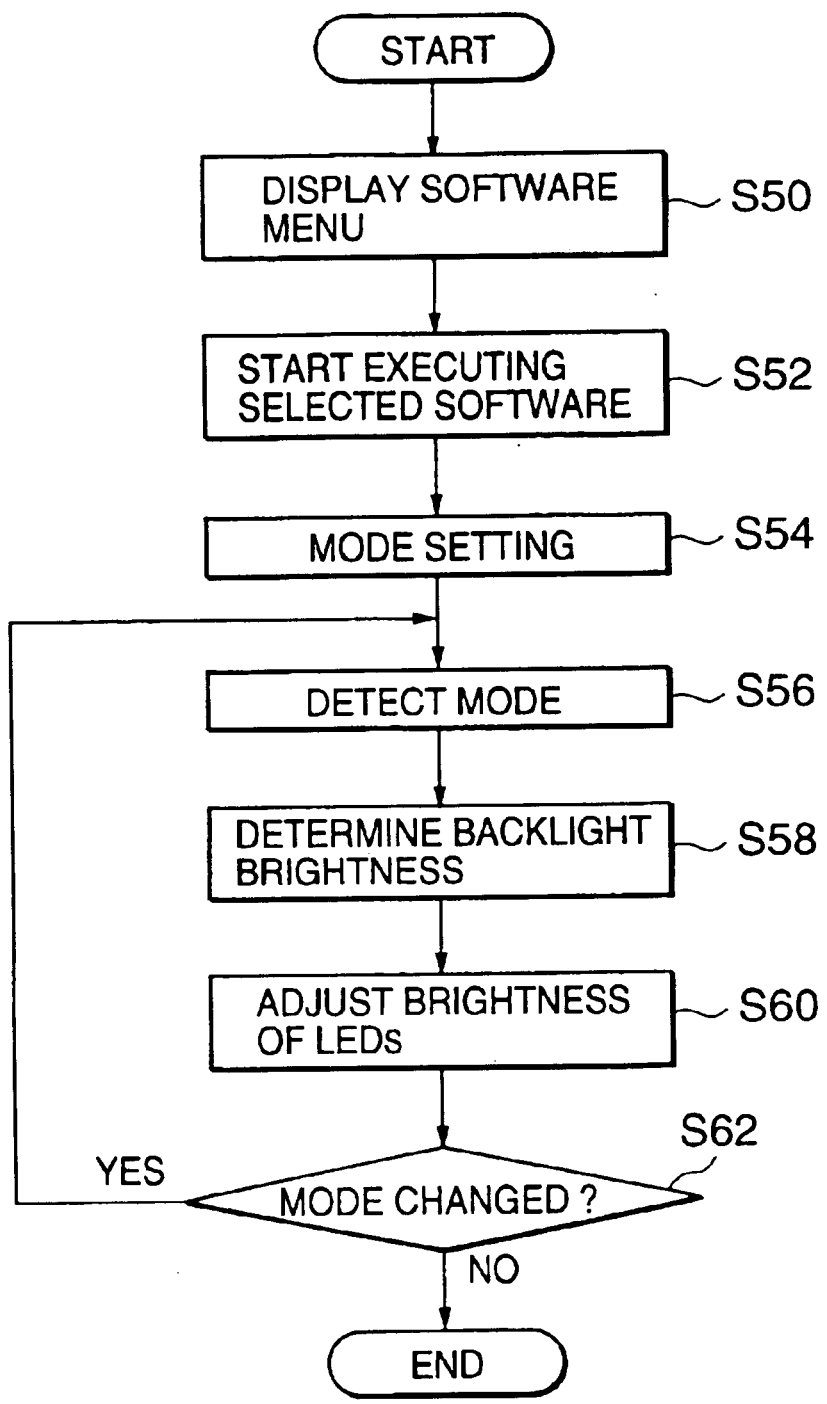

ELECTRONIC APPARATUS WITH BACKLIGHTING DEVICE

BACKGROUND OF THE INVENTION

1. Field of the Invention

The present invention relates to an electronic apparatus, and more particularly, to an electronic apparatus equipped with a backlighting device for backlighting a display and an input device.

2. Description of the Prior Art

Electronic apparatuses such as cellular phone terminals, personal-handy phone system (PHS) terminals, portable information processing devices, electronic databooks, pagers, etc., are typically provided with a display, such as a liquid-crystal display, and an input device having a plurality of keys to display or edit necessary information. Recent electronic apparatuses are also provided with a backlighting device to make the display visible in dark places and to prevent erroneous operations of the input device during input operations. For example, when characters or symbols are input through the keypad in a data input mode, the backlighting device automatically backlights the display and the input device, allowing for easy data input operations even in dark places.

However, a backlighting device also consumes current and continuous backlighting consumes more power than necessary. Thus, various improvements aimed at more efficient power consumption of backlighting have been proposed. There has been widely known, for example, an electronic apparatus having a timer therein to control the backlighting time. More specifically, the electronic apparatus turns on the backlighting device and starts time measurement by the timer when a key input operation is performed. After a lapse of a predetermined time, the backlighting is automatically turned off. Such a configuration can avoid a reduction of the life of a battery caused by long-time lighting induced by the user forgetting to turn it off, etc.

Furthermore, as another conventional example, the ON/OFF control technique for the backlighting has been disclosed in Japanese Patent Laid-Open No. 9-252342. More specifically, a portable telephone with a backlit display is provided with a light-intensity detector that detects surrounding light intensity, a time-of-day clock, and a battery monitor that detects the remaining quantity of a battery. The brightness of the backlit display is determined based on the surrounding light intensity, the time of day, and the remaining quantity of the battery.

However, in the prior art that controls the backlighting time with a timer, the backlighting turns on for a predetermined time with constant brightness. Accordingly, when key is pressed once, the backlighting continues for a while even after the press of the key, thus consuming more power than necessary. Furthermore, when key input operations are performed consecutively, one key operation is followed by another key operation before the lighting time for the first key operation times out. As a result the backlighting remains on continuously, which accelerates the shortening of the life of the battery. This power consumption is particularly noticeable when input operations are carried out for a long time consecutively in data input mode, which is set to make use of functions such as mail transmission/reception and registration of telephone numbers in a telephone directory.

Furthermore, the portable telephone disclosed in the Japanese Patent Laid-Open No. 9-252342 determines the brightness based on the surrounding light intensity, the time of day, and the battery remaining quantity to adjust the brightness of the backlighting. Thus, since the brightness is adjusted irrespective of the screen display status and operating mode, the brightness is set to a level higher than necessary, which leads to an acceleration of power consumption. Moreover, the brightness of the backlighting is generally set to a relatively high level due to the attaching of greater importance to visibility and design factors. But from the standpoint of reducing power consumption it is desirable to reduce the brightness to a necessary minimum level, especially in a battery-powered electronic device.

SUMMARY OF THE INVENTION

The present invention has been achieved by taking into account the points as described above and it is an object of the present invention to provide an electronic apparatus and a control method capable of suppressing excessive power consumption while maintaining necessary brightness.

According to an aspect of the present invention, an electronic apparatus includes: a display section; an input section having a plurality of keys; a backlighting section for backlighting the display section and/or the input section; a mode detecting section for detecting a currently set operation mode that is one of predetermined operation modes when performing a function; and a backlighting control section for controlling brightness of the backlighting section depending on the currently set operation mode.

The predetermined operation modes may include a data input mode and a data display mode, wherein the backlighting control section reduces the brightness of the backlighting section when the data input mode has been set.

The electronic apparatus may further include a mobile telephone section performing a mobile telephone function. The predetermined operation modes may include a data input mode, a data display mode and a communication status display mode. The mobile telephone section may have a plurality of functions including a voice communication function, a mailing function, a short-messaging function, a phone directory function, a scheduling function, and a game function. The backlighting control section may reduce the brightness of the backlighting section when the data input mode has been set.

The electronic apparatus may further include an information processing section on which one of a plurality of programs runs to generate a corresponding function. The predetermined operation modes may include a text mode, a graphic mode, a display mode, a data input modes, and a data display mode, which are operation modes in a function that is one of previously installed functions and functions to be generated by a plurality of application programs. The backlighting control section may reduce the brightness of the backlighting section when the data input mode has been set. The plurality of programs may include a brightness designation program, wherein the backlighting control section controls brightness of the backlighting section depending on a designated brightness level obtained by running the brightness designation program on the information processing section.

The electronic apparatus may further include a brightness-change selector for selecting one of a change mode and a no-change mode in brightness depending on a user's instruction inputted through the input section, wherein the backlighting control section changes the brightness of the backlighting section depending on the currently set operation mode when the change mode is selected and does not change the brightness of the backlighting section when the no-change mode is selected.

The backlighting control section may include: a brightness determining section for determining brightness of the backlighting depending on a currently set operation mode to produce a brightness determination signal; and a brightness control section for controlling the brightness of the backlighting depending on the brightness determination signal. The brightness determining section may determine brightness of the backlighting as one of a plurality of brightness levels depending on the currently set operation mode. The brightness control section may control the brightness of the backlighting depending on a determined brightness level.

The brightness control section may include: a plurality of resister circuits connected to each of a plurality of light-emitting elements provided in the backlighting section, the resister circuits having different resistance values corresponding to the plurality of brightness levels, respectively; and a selector for selecting one of the resister circuits depending on the determined brightness level to adjust an amount of current flowing through each of the light-emitting elements in the backlighting section.

The brightness control section may include a chopper circuit connecting a power supply to the backlighting section, for adjust an amount of current flowing through each of the light-emitting elements in the backlighting section depending on the determined brightness level.

BRIEF DESCRIPTION OF THE DRAWINGS

FIG. 2 is a block diagram showing a brightness control circuit employed in an electronic apparatus according to a first embodiment of the present invention;

FIG. 3 is a block diagram showing a brightness control circuit employed in an electronic apparatus according to a second embodiment of the present invention;

FIG. 7 is a flow chart showing another backlighting control operation of the electronic apparatus.

DETAILED DESCRIPTION OF THE PREFERRED EMBODIMENTS

With reference to the attached drawings, preferred embodiments of the present invention will be described in detail hereafter. Here, a mobile telephone terminal is taken as an example. Needless to say, the present invention is also applicable to another type of electronic apparatus such as a PHS terminal, a pager, or an information processing device.

Figure 1:
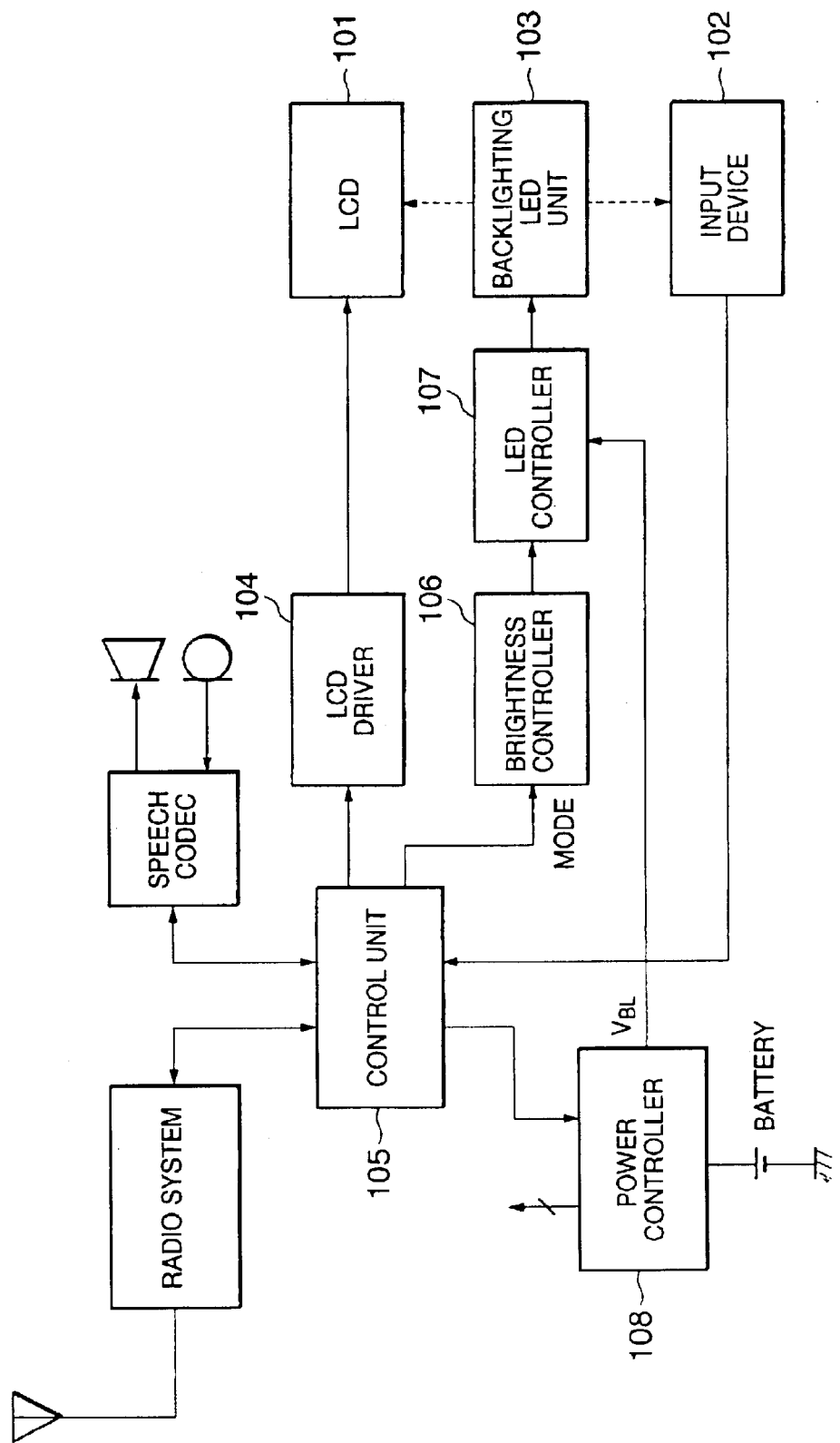
FIG. 1 is a block diagram showing an internal circuit configuration of a portable telephone that is an electronic apparatus according to an embodiment of the present invention.

Referring to FIG. 1, a mobile telephone is provided with a liquid-crystal display (LCD) 101 and an input device, which are backlit by a backlighting LED unit 103 under control of a control unit 105. The input device 102 is a key operation section composed of a ten-key pad and other necessary keys including an enter key and a power on/off key. The backlighting LED unit 103 has a plurality of light-emitting diodes (LEDs) therein.

The LCD 101 is driven by an LCD driver 104 controlled by the control unit 105. The control unit 105 includes a channel codec, a microprocessor, a read-only memory (ROM), and other necessary components, which are not shown in FIG. 1. The ROM stores various control programs, which are to run on the microprocessor. The control programs may include a mode detection program, a brightness control program, and mobile telephone control programs.

The mobile telephone is further provided with a brightness controller 106, an LED controller 107, and a power controller 108. The brightness controller 106 controls the LED controller 107 depending on a mode detection signal (MODE) received from the control unit 105. The LED controller 107 inputs a power-supply voltage $V_{BL}$ from the power controller 108 and supplies a controlled power to the backlighting LED unit 103 under control of the brightness controller 106. Therefore, the light intensity of the backlighting LED unit 103 is controlled depending on the mode detection signal.

A brightness control circuit according to a first embodiment of the present invention will be described with reference to FIG. 2.

As shown in FIG. 2, an electronic apparatus 1 such as a mobile telephone terminal or an information processing device includes a mode setting section 10, a mode detecting section 20, a brightness controller 30, an LED controller 40 and a backlighting LED unit 50.

The mode setting section 10 sets an operating status (mode) regarding the display or input device when the functions incorporated in the electronic apparatus 1 are executed. The functions incorporated in the electronic apparatus 1 include a voice communication function, electronic-mailing function, short-messaging function, telephone directory function, scheduling function, game playing function, and the likes.

The mode setting section 10 can select one of a plurality of modes including data input mode that allows data input using the input device of the electronic apparatus, data displaying mode that displays stored data on the display, communication status displaying mode that displays communication-related information, and the likes.

The incorporated functions and the modes have the following relationship. For example, the electronic-mailing function has a mail creation mode, a transmission mode, and a reception mode, etc. The mail creation mode needs the data input mode. It is also necessary to set the data input mode for the telephone directory function and the scheduling function. In this way, a plurality of modes are set for a single function and mode switching may be made even when a function is in progress.

The mode detecting section 20 detects the mode that is set by the mode setting section 10. This detection can be performed by receiving a mode setting signal indicative of the content of the mode from the mode setting section 10. After reception of the mode setting signal, the mode detecting section 20 outputs a mode detection signal. The brightness controller 30 determines the brightness of the backlighting LED unit 50 based on the mode detection signal received from the mode detecting section 20. The brightness refers to the level of lightness obtained by measuring luminous intensity or light intensity.

For example, the brightness controller 30 can reduce the brightness of the backlighting LED unit 50 when a mode detection signal indicates that the currently set mode is the data input mode. If such a determination is made, it is possible to reduce the brightness of the backlight conventionally set to a relatively high level taking into account the visibility of the user and design factors to a minimum level necessary for displaying. Therefore, it is possible to suppress excessive power consumption.

The LED controller 40 adjusts and controls the backlighting LED unit 50 in accordance with the brightness determined by the brightness controller 30. The backlighting LED unit 50 is configured by LEDs (light-emitting diodes) or EL (electroluminescent) elements. And the backlighting LED unit 50 backlights the display such as LCD and the keys of the input device.

Such a configuration makes it possible to determine and adjust the brightness of the backlighting LED unit 50 suitable for each of the modes of the functions incorporated in the electronic apparatus 1. Therefore, it is possible to efficiently consume power and extend the life of the battery.

Referring to FIG. 3, the electronic apparatus 1 can also be provided with a brightness selecting section 60 that allows the user to determine whether the brightness of the backlight should be changed or not. The brightness selecting section 60 causes a display section 70 to display a selection instruction such as "Do you change brightness of backlight? YES=1, NO=0" or "Do you wish power saving when entering characters? YES=1, NO=0". The display section 70 is not limited to an LCD, but can be configured by anything that has the function of displaying information and images and needs illumination by backlighting.

Then, the brightness selecting section 60 receives the selection result input through the input section 80 and sends the selection result signal to the brightness controller 30. The brightness controller 30 determines the brightness of the backlighting LED unit 50 based on the received selection result signal and the mode detection signal sent from the mode detecting section 20. Provision of this brightness selecting section 60 allows the user of the electronic apparatus 1 to change or adjust the brightness of the backlighting LED unit 50 at the user's discretion. This allows the user to adjust the display section 70 to the most required brightness and therefore save power consumption effectively.

Figure 4:
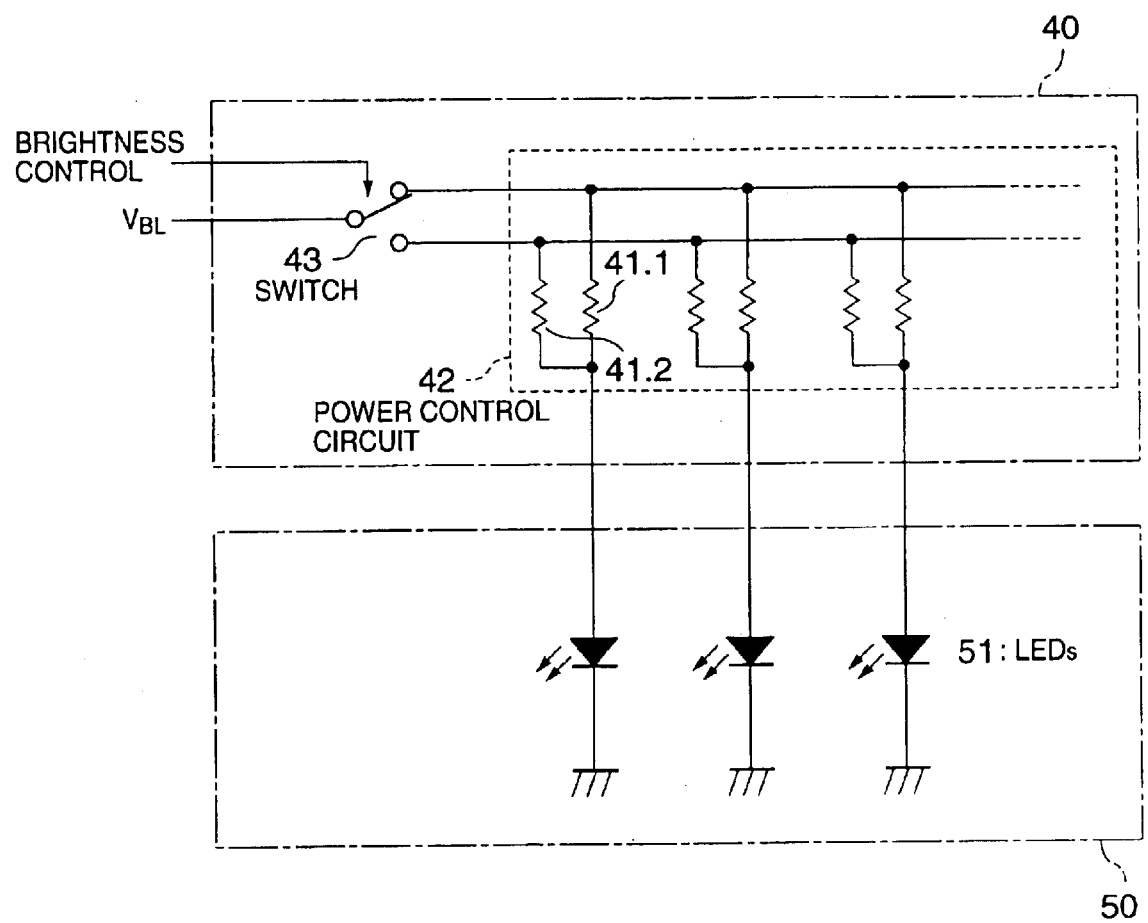
FIG. 4 is a circuit diagram showing an example of a combination of LED controller and a LED unit in the electronic apparatus according to the first or second embodiment.

As shown in FIG. 4, the LED controller 40 is provided with a power control circuit 42 composed of a plurality of pairs of resistors 41.1 and 41.2 connected in parallel corresponding in number with LEDs 51, which are a plurality of light-emitting diodes making up the backlighting LED unit 50. And a selector switch 43 selects one of the resistors 41.1 and 41.2 to supply the power supply voltage $V_{BL}$ to a selected one depending on the brightness control signal received from the brightness controller 30. Here, each of the plurality of LEDs 51 is connected in series with a corresponding one of the resistors 41.1 and 41.2. The number of resistors connected to a single LED is determined depending on the number of brightness levels. The resistance values of the resistors are determined depending on the brightness of the backlighting LED unit 50. For example, in the case where brightness is set to one of three levels, three resistors 41.1, 41.2, and 41.3 having resistance values each corresponding to the three levels of brightness are provided for each of the LEDs 51. The selector switch 43 selects one of the resistors 41.1, 41.2, and 41.3 depending on the brightness determined by the brightness controller 30.

In FIG. 4, two resistors 41.1 and 41.2 are connected to each LED 51, but the number of resistors is not limited to 2. As the selector switch 43, a 3-position slide switch is used, but the selector switch 43 is not limited to this.

Figure 5:
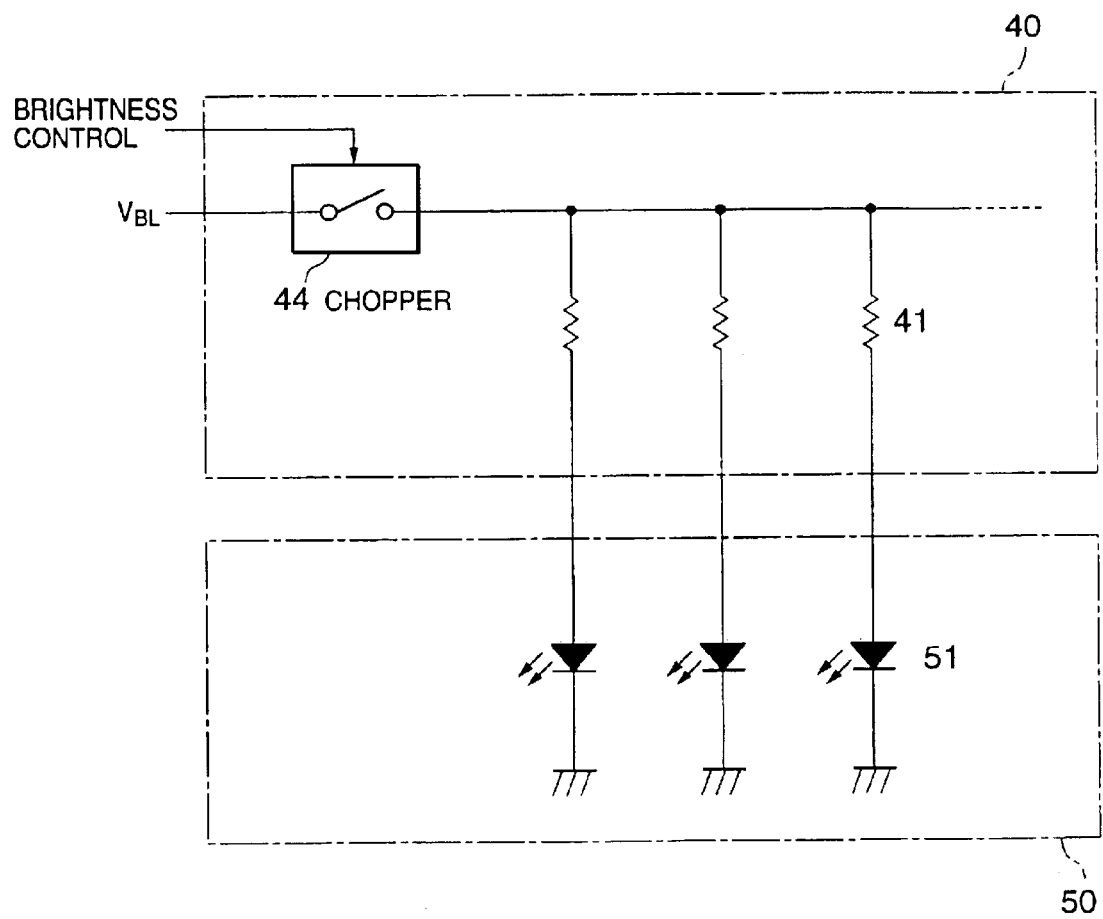
FIG. 5 is a circuit diagram showing another example of a combination of LED controller and a LED unit in the electronic apparatus according to the first or second embodiment.

As shown in FIG. 5, the LED controller 40 can also be provided with a chopper circuit 44. The chopper circuit 44 normally outputs an intermittent rectangular pulse or sawtooth pulse current. Therefore, it is possible to control the brightness of the LEDs 51 by adjusting the average output while changing the shape of a pulse or the interval between the rising and falling edges. Since this control enables analog-like changes, it is possible to adjust the brightness of the backlighting LED unit 50 best suited to the currently set mode.

Such a configuration of the LED controller 40 makes it possible to easily adjust the brightness of the LEDs 51, that is, the brightness of the backlighting LED unit 50 with a simple circuit configuration. Thus, it is possible to provide efficient power consumption saving and thereby extend the life of the power supply. Beside the above configuration, the LED controller 40 can also be configured by an inverter controller or variable resistor allowing adjustment of current flowing through the LEDs 51.

Hereafter, taking a mobile telephone terminal 1 of FIG. 3 as an example, a brightness adjustment operation thereof will be described.

Figure 6:
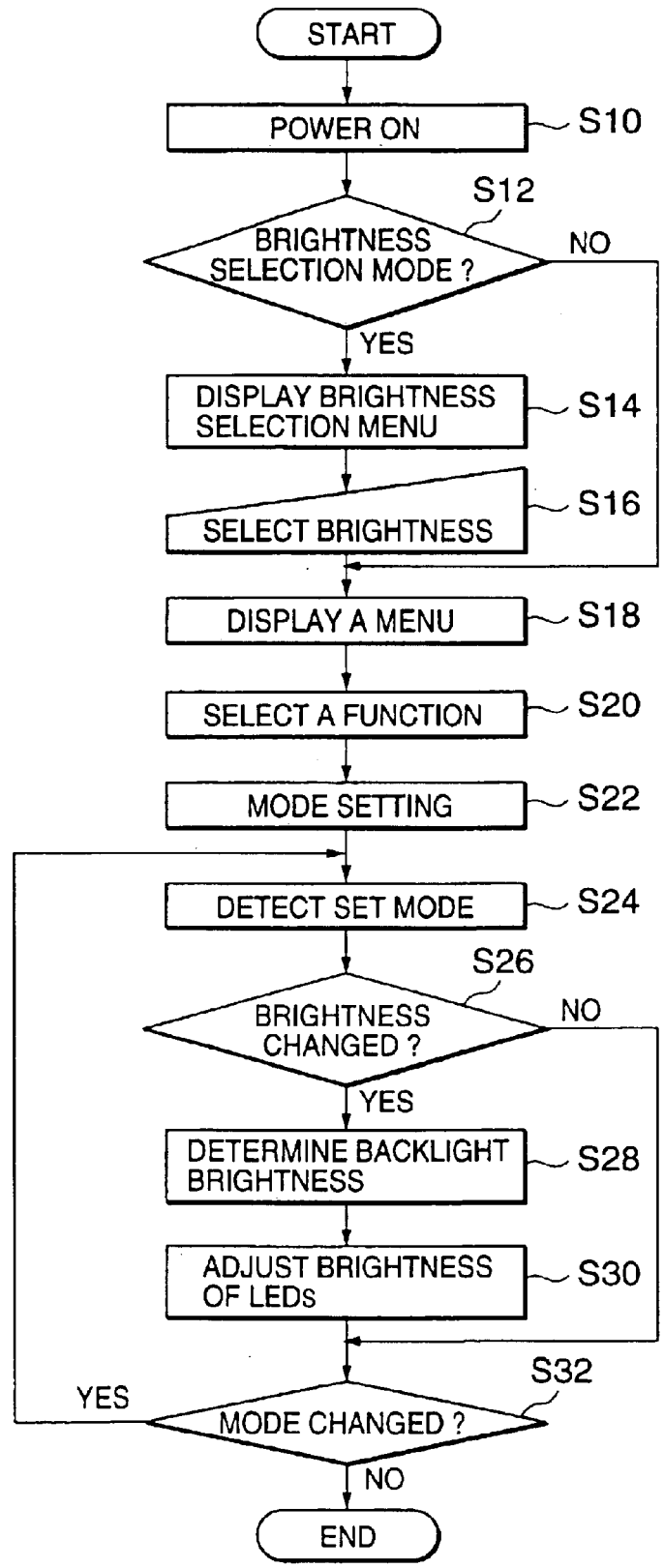
FIG. 6 is a flow chart showing a backlighting control operation of an electronic apparatus.

Referring to FIG. 6, when power is turned on (step S10), the mobile telephone terminal 1 is placed in a standby state waiting for a call to arrive. In this state, it is assumed that the backlighting LED unit 50 is not driven. Then, the brightness selecting section 60 determines whether the brightness of the backlighting is set to be changeable by a selection instruction of the user (step S12). When the brightness of the backlighting is set to be changeable (YES at step S12), the display 70 displays a selection instruction menu to prompt the user to determine whether the brightness of the backlighting LED unit 50 should be changed or not, that is, whether a power-saving mode should be set or not (step S14).

In response to the display of this selection instruction menu, when the result of selection whether the brightness should be changed or not is input from the input device 80 (step S16), the selection result signal is stored in a memory (not shown) via the brightness selecting section 60. In the case where the brightness of the backlighting is not set to selection mode (NO at step S12), neither step S14 nor step S16 is performed.

Thereafter, when an operation to execute a function incorporated in the mobile telephone terminal 1 is performed through the input device 80, a function menu is displayed on a screen of the display 70 (step S18). When a function to be executed is selected from the function menu displayed (step S20), the initial image of the selected function is displayed on the display 70 and thereby the mode setting section 10 sets a mode for the selected function (step S22). After the setting, the mode detecting section 20 detects the content of the mode set by the mode setting section 10 (step S24). A mode detection signal indicative of the setting content is sent to the brightness controller 30.

In the case where the selection result has been input at the step S16, the brightness controller 30 receives the mode detection signal from the mode detection section 20 and the selection result signal from the memory via the brightness selecting section 60.

The brightness controller 30 then determines whether the brightness of the backlighting should be changed or not, depending on the mode detection signal or both the detection signal and selection result signal (step S26). When it is determined that the brightness of the backlighting should be changed (YES at step S26), the brightness of the backlighting LED unit 50 is determined (step S28). The determined brightness is sent from the brightness controller 30 to the LED controller 40 as a determination signal. Then, the LED controller 40 adjusts the brightness of the backlighting LED unit 50 depending on the determination signal (step S30). When it is determined at the step S26 that the brightness of the backlighting should not be changed (NO at step S26), neither the step S28 nor the step S30 is performed. Thereafter, the steps S24–S30 are repeatedly performed every time the mode is switched (YES at step S32).

Such a configuration of the mobile telephone terminal 1 makes it possible to adjust the brightness of the backlighting LED unit 50 depending on a currently set mode. This configuration also allows the user to change the brightness of the backlighting LED unit 50 at the user's discretion. This makes it possible to suppress power consumption at the backlighting LED unit 50 to a necessary minimum and thereby extend the life of the battery.

The steps S12, S14 and S16 (setting of brightness selection by the user) can also be performed after the step S18. That is, it is also possible to display menu items such as "power-saving mode" and "illumination adjustment mode" in the function menu and to perform the steps S14 and S16 depending on the user's selection. Furthermore, after the selection result has been input at the step S16, it is also possible for the brightness selecting section 60 to continue to output the selection result signal to the brightness controller 30. In this case, when the brightness controller 30 receives a mode detection signal, the brightness controller 30 determines the brightness of the backlighting based on the detection signal and selection result signal.

Hereafter, taking a portable information processing device of FIG. 2 as an example, a brightness adjustment operation thereof will be described. In this case, the brightness adjustment is performed depending on a currently set mode of an incorporated function and an executed program.

The electronic apparatus 1 in this embodiment is a portable information processing apparatus typified by a portable personal computer, a mobile tool, an electronic databook, etc. The portable information processing apparatus 1 has a configuration as shown in FIG. 2 as in the case of the first embodiment. However, the portable information processing apparatus 1 executes incorporated functions and stored software programs including application programs. Therefore, the target for mode setting and detection is the mode in execution of incorporated function and software program. The modes include text mode, graphic mode, displaying mode in a plurality of layers, data inputting mode and data displaying mode etc. One of these modes may be selected or a plurality of these modes may be set.

When a detection signal indicative of the setting that data input is allowed is input, the brightness controller 30 can determine that the brightness of the backlighting is reduced. Such a determination makes it possible to suppress to a minimum level necessary for data displaying the brightness of the backlight, which is conventionally set to a relatively high level taking into account the visibility condition of the user and design factors, etc. Therefore, power consumption more than necessary can be suppressed.

Referring to FIG. 7, when the portable information processing apparatus 1 is powered on, a menu of executable software programs is displayed (step S50). When a software program to be executed is selected from this menu, the selected program starts running (step S52). At the time of starting execution, the mode setting section 10 sets the mode of the software program to be executed (step S54). The set mode is detected by the mode detecting section 20 (step S56) and sent to the brightness controller 30 as a mode detection signal.

Upon receipt of the mode detection signal, the brightness controller 30 determines the brightness depending on the currently set mode and sends the determination signal to the LED controller 40 (step S58). Then, the LED controller 40 adjusts the brightness of the backlighting based on the determination signal (step S60). Then, the steps S56–S60 are repeatedly performed every time the mode is switched to a new one (YES at step S62).

The portable information processing apparatus 1 may be provided with a brightness selecting section 60 as shown in FIG. 3. In this case, the operations from the steps S12–16 of FIG. 6 (brightness selection by the user) can be performed.

Such a configuration of the portable information processing apparatus 1 makes it possible to adjust the brightness of the backlighting LED unit 50 suited to a software program currently being executed. Thereby, it is possible to suppress power consumption to a minimum.

In this embodiment, the mode detecting section 20 detects the mode set by the mode setting section 10 and the brightness controller 30 determines the brightness of the backlighting LED unit 50 based on the detected mode setting content. However, in the case where the application software to be executed incorporates a program designating the brightness of the backlighting (brightness designating program), it is also possible to execute this brightness designating program to adjust the brightness of the backlighting LED unit 50.

Such an application program makes it possible to backlight the display and the input device at specified brightness of a required amount, resulting in reduced power consumption to a necessary minimum.

In addition to the mobile telephone and the portable information processing apparatus described in the above embodiments, an electronic apparatus according to the present invention can also be configured by another device or apparatus provided with a display such as LCD. For example, when the present invention is applied to a digital display clock including an LCD, it is possible to adjust the brightness of the backlighting depending on a function execution status such as a normal time displaying status, data input status for correction of the time, and other modes of respective functions.

Furthermore, when the present invention is applied to a liquid-crystal Television set, a car navigation system, etc., it is possible to adjust the brightness of the backlighting depending on a display mode, for example, character displaying mode or image displaying mode. In the case of a LCD display game machine, it is also possible to enhance stage effects by changing the brightness of the backlighting depending on the type of a game or the development of a story in progress.

As described above, the electronic apparatus according to the present invention can adjust the brightness of the backlighting depending on a currently set mode of an incorporated function or a stored software program. Therefore, the electronic apparatus according to the present invention can suppress power consumption of the backlighting to a necessary minimum and extend the life of a battery.

Further, it is possible for the user to obtain the brightness that the user recognizes it necessary by provision of means for making the user select whether the brightness of the backlighting should be changed or not, thereby making it possible to effectively use power.

In the case where the data input mode is set, the brightness of the backlighting can be reduced. Therefore, excess power consumption can be avoided when the backlighting is continuously needed.

Furthermore, incorporating a brightness designating program into application software makes it possible to adjust the backlight to a level of brightness necessary to execute an application program and thereby suppress power consumption effectively.

Moreover, connecting a plurality of resistors or a chopper circuit in series to LEDs making up the backlighting LED unit in the brightness controller and providing a selector switch to change between these resistors make it possible to adjust the brightness of the backlighting with a small and simple circuit.

What is claimed is:

1. An electronic apparatus comprising:

a display section;

an input section having a plurality of keys;

a backlighting section for backlighting the display section and/or the input section;

a mode detecting section for detecting a currently set operation mode that is one of a plurality of different predetermined operation modes, wherein the plurality of different predetermined operation modes include a data input mode and a data display mode, wherein the backlighting control section reduces the brightness of the backlighting section when the data input mode has been set; and further comprising:

an information processing section on which one of a plurality of programs runs to generate a corresponding function; and wherein the plurality of programs include a brightness designation program, wherein the backlighting control section controls brightness of the backlighting section depending on a designated brightness level obtained by running the brightness designation program on the information processing section.

2. The electronic apparatus according to claim 1, further comprising:

a mobile telephone section performing a mobile telephone function.

3. The electronic apparatus according to claim 2, wherein the plurality of different predetermined operation modes include a data input mode, a data display mode, and a communication status display mode.

4. The electronic apparatus according to claim 2, wherein the mobile telephone section has a plurality of functions including a voice communication function, a mailing function, a short-messaging function, a phone directory function, a scheduling function, and a game function.

5. The electronic apparatus according to claim 3, wherein the backlighting control section reduces the brightness of the backlighting section when the data input mode has been set.

6. The electronic apparatus according to claim 1, wherein the plurality of different predetermined operation modes include a text mode, a graphics mode, a display mode, a data input mode, and a data display mode, which are operation modes in a function that is one of previously installed functions and functions to be generated by a plurality of application programs.

7. The electronic apparatus according to claim 6, wherein the backlighting control section reduces the brightness of the backlighting section when the data input mode has been set.

8. The electronic apparatus according to claim 1, further comprising:

a brightness-change selector for selecting one of a change mode and a no-change mode in brightness depending on a user's instruction inputted through the input section, wherein the backlighting control section changes the brightness of the backlighting section depending on the currently set operation mode when the change mode is selected and does not change the brightness of the backlighting section when the no-change mode is selected.

9. The electronic apparatus according to claim 1, wherein the backlighting control section comprises:

a brightness determining section for determining brightness of the backlighting depending on a currently set operation mode to produce a brightness determination signal; and a brightness control section for controlling the brightness of the backlighting depending on the brightness determination signal.

10. The electronic apparatus according to claim 9, wherein the brightness determining section determines brightness of the backlighting as one of a plurality of brightness levels depending on the currently set operation mode, and the brightness control section controls the brightness of the backlighting depending on a determined brightness level.

11. The electronic apparatus according to claim 10, wherein the brightness control section comprises:

a plurality of resister circuits connected to each of a plurality of light-emitting elements provided in the backlighting section, the resister circuits having different resistance values corresponding to the plurality of brightness levels, respectively; and a selector for selecting one of the resister circuits depending on the determined brightness level to adjust an amount of current flowing through each of the light-emitting elements in the backlighting section.

12. The electronic apparatus according to claim 10, wherein the brightness control section comprises:

a chopper circuit connecting a power supply to the backlighting section, for adjusting an amount of current flowing through each of the light-emitting elements in the backlighting section depending on the determined brightness level.

13. In an electronic apparatus having a display section, an input section having a plurality of keys, and a backlighting section for backlighting the display section and/or the input section, a method for controlling brightness of the backlighting section, comprising the steps of:

a) detecting a currently set operation mode that is one of a plurality of different predetermined operation modes when preforming a function; and b) controlling brightness of the backlighting section depending on the currently set operation mode;

c) executing one of a plurality of programs to generate a corresponding one of the plurality of different predetermined operating modes wherein one of the plurality of programs includes a brightness designation program wherein backlighting is controlled depending on a designated brightness level obtained by running the brightness designation program;

wherein the plurality of different predetermined operation modes include a data input mode and a data display mode, wherein, in the step (b), when the data input mode has been set, the brightness of the backlighting section is reduced.

14. The method according to claim 13, further comprising the step of:

c) selecting one of a change mode and a no-change mode in brightness depending on a user's instruction inputted through the input section, wherein, in the step (b), the brightness of the backlighting section is changed depending on the currently set operation mode when the change mode is selected and the brightness of the backlighting section is not changed depending on the currently set operation mode when the no-change mode is selected.

* * * * *